(12) United States Patent
Yano

(10) Patent No.: US 6,477,557 B1
(45) Date of Patent: *Nov. 5, 2002

(54) DIVISION CIRCUIT NOT REQUIRING TAKING COMPLEMENTS OF DIVISOR, DIVIDEND AND REMAINDER

(75) Inventor: Naoka Yano, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/521,221

(22) Filed: Mar. 8, 2000

Related U.S. Application Data

(62) Division of application No. 09/055,993, filed on Apr. 7, 1998, now Pat. No. 6,047,305.

(30) Foreign Application Priority Data

Apr. 7, 1997 (JP) ............................................. 9-88187

(51) Int. Cl.[7] .................................................. G06F 7/52
(52) U.S. Cl. ....................................................... 708/655
(58) Field of Search .................................. 708/655, 656

(56) References Cited

U.S. PATENT DOCUMENTS

| | | | |
|---|---|---|---|
| 5,016,210 A | 5/1991 | Sprague et al. ............. | 708/655 |
| 5,208,769 A | 5/1993 | Mandava ..................... | 708/655 |
| 5,574,677 A | 11/1996 | Cohen ......................... | 708/655 |
| 5,903,486 A | 5/1999 | Curtet ......................... | 708/655 |

*Primary Examiner*—David H. Malzahn
(74) *Attorney, Agent, or Firm*—Foley & Lardner

(57) ABSTRACT

In division process of restoring type or non-restoring type, a partial remainder is compared with a divisor in terms of absolute value. If the partial remainder is larger or both are equal, a quotient of its column is regarded as 1 and if small, the quotient of that column is regarded as 0 upon this division.

14 Claims, 11 Drawing Sheets

FIG. 2 PRIOR ART

| CYCLE | ACTION | OPERATION | OUTPUT OF REGISTER 103 | OUTPUT OF REGISTER 102 | OUTPUT OF REGISTER 101 |
|---|---|---|---|---|---|
| 1, 2 | 1 | CONVERT TO a%=0111, b%=0011. | | | |
| 3 | 2 | LOAD DATA. | | | |
| 4 | 3-1 | P#=0000 | 0011 | 0000 | 0111 |
| | 3-2 | P#-B=1101 | 0011 | 0000 | 0111 |
| | 3-3 | THE QUOTIENT IS 0 BECAUSE OUTPUT OF SUBTRACTOR IS NEGATIVE. | 0011 | 0000 | 0111 |
| | 3-4 | WRITE P# INTO REGISTER 101. | 0011 | 0000 | 0111 |
| 5 | 3-1 | P#=0001 | 0011 | 0000 | 1110 |
| | 3-2 | P#-B=1110 | 0011 | 0000 | 1110 |
| | 3-3 | THE QUOTIENT IS 0 BECAUSE OUTPUT OF SUBTRACTOR IS NEGATIVE. | 0011 | 0000 | 1110 |
| | 3-4 | WRITE P# INTO REGISTER 101. | 0011 | 0000 | 1110 |
| 6 | 3-1 | P#=0011 | 0011 | 0001 | 1100 |
| | 3-2 | P#-B=0000 | 0011 | 0001 | 1100 |
| | 3-3 | THE QUOTIENT IS 1 BECAUSE OUTPUT OF SUBTRACTOR IS NOT NEGATIVE. | 0011 | 0001 | 1100 |
| | 3-4 | WRITE (P#-B) INTO REGISTER 101. | 0011 | 0001 | 1100 |
| 7 | 3-1 | P#=0001 | 0011 | 0000 | 1001 |
| | 3-2 | P#-B=1110 | 0011 | 0000 | 1001 |
| | 3-3 | THE QUOTIENT IS 0 BECAUSE OUTPUT OF SUBTRACTOR IS NEGATIVE. | 0011 | 0000 | 1001 |
| | 3-4 | WRITE P# INTO REGISTER 101. | 0011 | 0000 | 1001 |
| 8 | 5 | TAKE A COMPLEMENT OF 2 FOR A BECAUSE THE SIGN OF DIVIDEND IS DIFFERENT FROM THAT OF DIVISOR. (1110) | 0011 | 0001 | 0010 |
| 9 | 6 | TAKE A COMPLEMENT OF 2 FOR P BECAUSE DIVIDEND IS NEGATIVE(1110) | 0011 | 0001 | 1110 |
| 10 | 7 | TERMINATE DIVISION. | 0011 | 1111 | 1110 |

CASE FOR CALCULATING a/b UNDER a = 0111, b = 0011

FIG. 4 PRIOR ART

| CYCLE | ACTION | OPERATION | OUTPUT OF REGISTER 103 | OUTPUT OF REGISTER 102 | OUTPUT OF REGISTER 101 |
|---|---|---|---|---|---|
| 1, 2 | 1 | CONVERT TO a%=0111, b%=0011. | | | |
| 3 | 2 | LOAD DATA. | | | |
| 4 | 3-1 | P#=0000 | 0011 | 0000 | 0111 |
| | 3-2 | P#-B=1101 | 0011 | 0000 | 0111 |
| | 3-3 | THE QUOTIENT IS 0 BECAUSE OUTPUT OF ADDER/SUBTRACTOR IS NEGATIVE. | 0011 | 0000 | 0111 |
| | 3-4 | WRITE (P#+B) INTO REGISTER 101. | 0011 | 0000 | 0111 |
| 5 | 4-1 | P#+B=1110 BECAUSE P#=1011 AND REGISTER 101 IS NEGATIVE. | 0011 | 1101 | 1110 |
| | 4-2 | THE QUOTIENT IS 0 BECAUSE OUTPUT OF ADDER/SUBTRACTOR IS NEGATIVE. | 0011 | 1101 | 1110 |
| | 4-3 | WRITE A VALUE OF (P#+B) INTO REGISTER 101. | 0011 | 1101 | 1110 |
| 6 | 4-1 | P#+B=0000 BECAUSE P#=1101 AND REGISTER 101 IS NEGATIVE. | 0011 | 1110 | 1100 |
| | 4-2 | THE QUOTIENT IS 1 BECAUSE OUTPUT OF ADDER/SUBTRACTOR IS NOT NEGATIVE. | 0011 | 1100 | 1100 |
| | 4-3 | WRITE (P#+B) INTO REGISTER 101. | 0011 | 1100 | 1100 |
| 7 | 4-1 | P#-B=1110 BECAUSE P#=0001 AND REGISTER 101 IS NOT NEGATIVE. | 0011 | 0000 | 1001 |
| | 4-2 | THE QUOTIENT IS 0 BECAUSE OUTPUT OF ADDER/SUBTRACTOR IS NEGATIVE. | 0011 | 0000 | 1001 |
| | 4-3 | WRITE (P#+B) INTO REGISTER 101. | 0011 | 0000 | 1001 |
| 8 | 6 | WRITE (P#+B) INTO REGISTER 101 BECAUSE OUTPUT OF REGISTER 101 IS NEGATIVE. | 0011 | 1110 | 0010 |
| 9 | 7 | TAKE A COMPLEMENT OF 2 FOR A BECAUSE THE SIGN OF DIVIDEND IS DIFFERENT FROM THAT OF DIVISOR. (1110) | 0011 | 0001 | 0010 |
| 10 | 8 | TAKE A COMPLEMENT OF 2 FOR REGISTER 101 BECAUSE DIVIDEND IS NEGATIVE. (1111) | 0011 | 0001 | 1110 |
| 11 | 9 | TERMINATE DIVISION. | 0011 | 1111 | 1110 |

CASE FOR CALCULATING a/b UNDER a = 0111, b = 0011.

FIG. 7 OUTPUT OF REGISTER 1, OUTPUT OF REGISTER 2, OUTPUT OF REGISTER 3, OUTPUT OF REGISTER 4

| CYCLE | ACTION | OPERATION | OUTPUT OF REGISTER 1 | OUTPUT OF REGISTER 2 | OUTPUT OF REGISTER 3 | OUTPUT OF REGISTER 4 |
|---|---|---|---|---|---|---|
| 1 | 1 | LOAD DATA. | | | | |
| 2 | 2-1 | P#=1111 | 0011 | 1111 | 1001 | 0000 |
|   | 2-2 | P#+B=0010 BECAUSE THE SIGN OF DIVIDEND IS DIFFERENT FROM THAT OF DIVISOR. | 0011 | 1111 | 1001 | 0000 |
|   | 2-3 | SHIFT A BY A BIT TO THE LEFT. | 0011 | 1111 | 1001 | 0000 |
|   | 2-4 | BOTH ALL ZERO DETECTORS 7,8 INDICATE 0. THE QUOTIENT IS 0 BECAUSE (P#+B) IS POSITIVE AND DIFFERENT FROM DIVIDEND IN TERMS OF SIGN. | 0011 | 1111 | 1001 | 0000 |
|   | 2-5 | P# VALUE IS WRITTEN INTO REGISTER 3 BECAUSE THE QUOTIENT IS 0. | 0011 | 1111 | 0010 | 0000 |
| 3 | 2-1 | P#=1110 | 0011 | 1111 | 0010 | 0000 |
|   | 2-2 | P#+B=0010 BECAUSE THE SIGN OF DIVIDEND IS DIFFERENT FROM THAT OF DIVISOR. | 0011 | 1111 | 0010 | 0000 |
|   | 2-3 | SHIFT A BY A BIT TO THE LEFT. | 0011 | 1111 | 0010 | 0000 |
|   | 2-4 | BOTH ALL ZERO DETECTORS 7,8 INDICATE 0. THE QUOTIENT IS 0 BECAUSE (P#+B) IS POSITIVE AND DIFFERENT FROM DIVIDEND IN TERMS OF SIGN. | 0011 | 1111 | 0010 | 0000 |
|   | 2-5 | P# VALUE IS WRITTEN INTO REGISTER 3 BECAUSE THE QUOTIENT IS 0. | 0011 | 1110 | 0100 | 0000 |
| 4 | 2-1 | P#=1100 | 0011 | 1110 | 0100 | 0000 |
|   | 2-2 | P#+B=1111 BECAUSE THE SIGN OF DIVIDEND IS DIFFERENT FROM THAT OF DIVISOR. | 0011 | 1110 | 0100 | 0000 |
|   | 2-3 | SHIFT A BY A BIT TO THE LEFT. | 0011 | 1110 | 0100 | 0000 |
|   | 2-4 | BOTH ALL ZERO DETECTORS 7,8 INDICATE 0. THE QUOTIENT IS 1 BECAUSE (P#+B) IS NEGATIVE AND THE SAME FROM DIVIDEND IN TERMS OF SIGN. | 0011 | 1110 | 0100 | 0000 |
|   | 2-5 | (P#+B) VALUE IS WRITTEN INTO REGISTER 3 BECAUSE THE QUOTIENT IS 1. | 0011 | 1111 | 1000 | 0001 |
| 5 | 2-1 | P#=1111 | 0011 | 1111 | 1000 | 0000 |
|   | 2-2 | P#+B=0010 BECAUSE THE SIGN OF DIVIDEND IS DIFFERENT FROM THAT OF DIVISOR. | 0011 | 1111 | 1000 | 0000 |
|   | 2-3 | SHIFT A BY A BIT TO THE LEFT. | 0011 | 1111 | 1000 | 0000 |
|   | 2-4 | BOTH ALL ZERO DETECTORS 7,8 INDICATE 0. THE QUOTIENT IS 0 BECAUSE (P#+B) IS POSITIVE AND DIFFERENT FROM DIVIDEND IN TERMS OF SIGN. | 0011 | 1111 | 1000 | 0000 |
|   | 2-5 | P# VALUE IS WRITTEN INTO REGISTER 3 BECAUSE THE QUOTIENT IS 0. | 0011 | 1111 | 0000 | 0000 |
| 6 | 4 | TAKE A COMPLEMENT OF 2 FOR Q BECAUSE THE SIGN OF DIVIDEND IS DIFFERENT FROM THE SIGN OF DIVISOR | 0011 | 1111 | 0000 | 0010 |
| 7 | 5 | TERMINATE DIVISION | 0011 | 1111 | 0000 | 1110 |

CASE FOR CALCULATING a/b UNDER a = 1001, b = 0011.

FIG. 9

| CYCLE | ACTION | OPERATION | OUTPUT OF REGISTER 1 | OUTPUT OF REGISTER 2 | OUTPUT OF REGISTER 3 | OUTPUT OF REGISTER 4 |
|---|---|---|---|---|---|---|
| 1 | 1 | LOAD DATA. | | | | |
| 2 | 2-1 | P#=1111 | 0011 | 1111 | 1001 | 0000 |
|   | 2-2 | P#+B=0010 BECAUSE THE SIGN OF DIVIDEND IS DIFFERENT FROM THAT OF DIVISOR. | 0011 | 1111 | 1001 | 0000 |
|   | 2-3 | SHIFT A BY A BIT TO THE LEFT. | 0011 | 1111 | 1001 | 0000 |
|   | 2-4 | BOTH ALL ZERO DETECTORS 7,8 INDICATE 0. THE QUOTIENT IS 0 BECAUSE (P#+B) IS POSITIVE AND DIFFERENT FROM DIVIDEND IN TERMS OF SIGN. | 0011 | 1111 | 1001 | 0000 |
|   | 2-5 | (P#+B) VALUE IS WRITTEN INTO REGISTER 3. | 0011 | 1111 | 1001 | 0000 |
| 3 | 3-1 | P#=0100 P#+B=0001 BECAUSE THE SIGN OF DIVIDEND IS DIFFERENT FROM THAT OF DIVISOR AND THE QUOTIENT OF PREVIOUS CYCLE IS 0. | 0011 | 0010 | 0010 | 0000 |
|   | 3-2 | SHIFT A BY A BIT TO THE LEFT. | 0011 | 1111 | 0010 | 0000 |
|   | 3-3 | BOTH ALL ZERO DETECTORS 7,8 INDICATE 0. THE QUOTIENT IS 0 BECAUSE (P#+B) IS POSITIVE AND DIFFERENT FROM DIVIDEND IN TERMS OF SIGN. | 0011 | 1111 | 0010 | 0000 |
|   | 3-4 | (P#+B) VALUE IS WRITTEN INTO REGISTER 3. | 0011 | 1111 | 0010 | 0000 |
| 4 | 3-1 | P#=0010 P#+B=1111 BECAUSE THE SIGN OF DIVIDEND IS DIFFERENT FROM THAT OF DIVISOR AND THE QUOTIENT OF PREVIOUS CYCLE IS 0. | 0011 | 0001 | 0100 | 0000 |
|   | 3-2 | SHIFT A BY A BIT TO THE LEFT. | 0011 | 0001 | 0100 | 0000 |
|   | 3-3 | BOTH ALL ZERO DETECTORS 7,8 INDICATE 0. THE QUOTIENT IS 1 BECAUSE (P#+B) IS NEGATIVE AND DIFFERENT FROM DIVIDEND IN TERMS OF SIGN. | 0011 | 0001 | 0100 | 0000 |
|   | 3-4 | (P#+B) VALUE IS WRITTEN INTO REGISTER 3. | 0011 | 1111 | 0100 | 0000 |
| 5 | 3-1 | P#=1111 P#+B=0010 BECAUSE THE SIGN OF DIVIDEND IS DIFFERENT FROM THAT OF DIVISOR AND THE QUOTIENT OF PREVIOUS CYCLE IS 0. | 0011 | 1111 | 1000 | 0001 |
|   | 3-2 | SHIFT A BY A BIT TO THE LEFT. | 0011 | 1111 | 1000 | 0001 |
|   | 3-3 | BOTH ALL ZERO DETECTORS 7,8 INDICATE 0. THE QUOTIENT IS 0 BECAUSE (P#+B) IS POSITIVE AND DIFFERENT FROM DIVIDEND IN TERMS OF SIGN. | 0011 | 1111 | 1000 | 0001 |
|   | 3-4 | (P#+B) VALUE IS WRITTEN INTO REGISTER 3. | 0011 | 1111 | 1000 | 0001 |
| 6 | 5 | (P#+B) IS WRITTEN INTO REGISTER 3 BECAUSE THE QUOTIENT OF PREVIOUS CYCLE IS 0 AND THE SIGN OF DIVIDEND IS DIFFERENT FROM THE SIGN OF DIVISOR. | 0011 | 0010 | 0000 | 0010 |
| 7 | 6 | TAKE A COMPLEMENT OF 2 FOR Q BECAUSE THE SIGN OF DIVIDEND IS DIFFERENT FROM THE SIGN OF DIVISOR | 0011 | 1111 | 0000 | 0010 |
| 8 | 7 | TERMINATE DIVISION | 0011 | 1111 | 0000 | 1110 |

CASE FOR CALCULATING a/b UNDER a = 1001, b = 0011.

DIVISION CIRCUIT NOT REQUIRING TAKING COMPLEMENTS OF DIVISOR, DIVIDEND AND REMAINDER

This application is a divisional application of U.S. Ser. No. 09/055,993, filed Apr. 7, 1998, which has issued as U.S. Pat. No. 6,047,305.

BACKGROUND OF THE INVENTION

1. Field of the Invention

This invention relates to a division circuit and more particularly to a division circuit for signed division

2. Description of the Prior Art

According to the prior art, when division on signed dividend and divisor expressed by a complement of 2 is carried out, in order to obtain an accurate quotient and remainder, if the dividend and/or divisor is negative, they are converted to positive values before the division. As a typical division algorithm, two examples of restoring type (pull-back method) and non-restoring type (pull-out method) will be described.

First, the conventional restoring type division algorithm will be explained referring to a structure of a division circuit shown in FIG. 1.

If a dividend of n bits is a and a divisor of m(n>m) bits is b in FIG. 1, a division circuit comprises a remainder register 101 of n bits for storing high order side of a partial remainder during division operation and storing the remainder at the time of division end, a dividend/quotient register 102 of n bits for storing a dividend at the time of division start and successively storing low order side of the partial remainder and a quotient during division operation, a divisor register 103 of n bits for storing the divisor, a subtractor 104 of n bits, a selector 105 in which data obtained by combining a content of the remainder register 101 with that of a dividend/quotient register 102 is shifted by 1 bit so that the highest bit is shifted out, and then, data P# of that high order n bits, namely, data obtained by combining low order n−1 bits of the remainder register 101 with the highest bit of the dividend/quotient register 102 or output of the subtractor 104 is selected and supplied to the remainder register 101, and a control circuit 106 for determining a quotient by receiving division result of the subtractor 104 and selectively controlling the selector 105.

Next, the division operation using the division circuit having such a structure will be described according to its operation cycle.

First, if the dividend a and/or divisor b are negative, they/it are/is converted to positive numbers by taking complements thereof. If both are not negative, they are used as they are and these values are treated as a% and b% (first cycle, second cycle, action 1).

Next, the dividend a% is loaded on the dividend/quotient register 102 and then the divisor b% is loaded on the divisor register 103. 0 is loaded on all bits of the remainder register 101 (third cycle, action 2).

Then, the remainder register 101 and dividend register 102 are shifted by 1 bit to the left and high order n bit of data obtained by combining both the registers after the shift is assumed to be P# (fourth cycle, action 3-1). Then, the output data of the divisor register 103 is subtracted from data P# by means of the subtractor 104 (fourth cycle, action 3-2). Then, the content of the dividend/quotient register 102 is shifted by 1 bit to the left. When the output of the subtractor 104 is negative, 0 is written to the least significant bit of the dividend/quotient register 102 as a quotient. If the output of the subtractor 104 is not negative, 1 is written into the least significant bit of the dividend/quotient register 102 as a quotient (fourth cycle, action 3-3). Then, if the output of the subtractor 104 is not negative, the output of the subtractor 104 is stored in the remainder register 101, and when the output of the subtractor 104 is negative, data P# is stored in the remainder register 101 (pull-back method) (fourth cycle, action 3-4).

The actions (3-1)–(3-4) of aforementioned fourth cycle is repeated further (n−1) times (fifth cycle—(n+3) cycle).

Next, if the sign of the dividend is the same as the sign of the divisor, the output of the dividend/quotient register 102 is stored in the dividend/quotient register 102 as a quotient. On the other hand, if the sign of the dividend is different from the sign of the divisor, a complement of the output of the dividend/quotient register 102 is taken and written back to the dividend/quotient register 102 ((n+4) cycle, action 5).

Next, when the dividend is not negative, the output of the remainder register 101 is stored as a remainder. On the other hand, when the dividend is negative, a complement of the output of the remainder register 101 is taken and written to the remainder register 101 ((n+5) cycle, action 6).

Finally, the quotient is stored in the dividend/quotient register 102 and the remainder is stored in the remainder register 101, and then the signed division is terminated ((n+6) cycle, action 7).

The division processing is carried out as described above. FIG. 2 shows an example of division in which dividend a=1001(binary) (means −7 according to decimal notation) and divisor b=0011 (binary) (means 3 according to decimal notation). In FIG. 2, the content of the remainder register 101 is expressed by P, the content of the dividend/quotient register 102 is expressed by A and the content of the divisor register 103 is expressed by B.

Then, the conventional non-restoring type division algorithm will be described with reference to a structure of the division circuit shown in FIG. 3.

In the aforementioned conventional non-restoring type division, if the partial remainder is negative, a temporarily subtracted divisor is pulled back and added, so that the partial remainder is returned to a positive number. However, considering a level lower by a digit, subtraction of the divisor is regarded as (remainder+divisor)×2−divisor. Then, because (remainder+divisor)×2−divisor is remainder×2+divisor, when the partial remainder is negative, it is possible to store the partial remainder as it is and shift it by a bit to the left and then carry out addition instead of subtraction of the partial remainder and divisor. This method can reduce operation time per cycle as compared to the restoring type division. The non-restoring type division algorithm uses such a method.

If a dividend of n bits is a and a divisor of m(n>m) bits is b in FIG. 3, a division circuit comprises a remainder register 111 of n bits for storing high order side of a partial remainder during division operation and storing the remainder at the time of division end, a dividend/quotient register 112 of n bits for storing a dividend at the time of division start and successively storing low order side of the partial remainder and a quotient during division operation, a divisor register 113 of n bits for storing the divisor, an adder/subtractor 114 of n bits, and a control circuit 115 for determining a quotient by receiving operation result of the adder/subtractor 114 and instructing the adder/subtractor 114 to carry out addition or subtraction according to operation result of the adder/subtractor 114.

Next, the division operation using the division circuit having such a structure will be described according to its operation cycle.

First, if the dividend a and/or divisor b are negative, they/it are/is converted to positive numbers by taking complements thereof. If both are not negative, they are used as they are and these values are treated as a% and b% (first cycle, second cycle, action 1).

Next, the dividend a% is loaded on the dividend/quotient register 112 and then the divisor b% is loaded on the divisor register 113. 0 is loaded on all bits of the remainder register 111 (third cycle, action 2).

Then, the remainder register 111 and dividend register 112 are shifted by 1 bit to the left and high order n bit of data obtained by combining both the registers after the shift is assumed to be P% (fourth cycle, action 3-1). Then, the output data of the divisor register 113 is subtracted from data P# by means of the subtractor 114 (fourth cycle, action 3-2). Then, the content of the dividend/quotient register 112 is shifted by 1 bit to the left. As for a value to be stored in the least significant bit of the dividend/quotient 112, when the output of the adder/subtractor 114 is negative, 0 is written into the least significant bit of the dividend/quotient register 112 as a quotient. If the output of the adder/subtractor 114 is not negative, 1 is written into the least significant bit of the dividend/quotient register 112 (fourth cycle, action 3-3). Subsequently, the output of the adder/subtractor 114 is stored in the remainder register 111 (fourth cycle, action 3-4).

In a next cycle, if the output of the remainder register 111 is negative, the remainder register 111 and dividend/quotient register 112 are shifted by a bit to the left. Then, data P# of high order n bits of data in which the contents of both the registers are combined after the shift and the output of the divisor register 113 are summed up by the adder/subtractor 114. On the other hand, if the output of the remainder register is not negative, the remainder register 111 and dividend/quotient register 112 are shifted by a bit to the left. Then, the output of the divisor register 113 is subtracted from data P# of high order n bits in which the contents of both the registers are combined after the shift by means of the adder/subtractor 114 (fifth cycle, action 4-1). Then, the content of the dividend/quotient register 112 is shifted by a bit to the left. When the output of the adder/subtractor 114 is negative, 0 is written into the least significant bit of the dividend/quotient register 112 as a quotient. If the output of the adder/subtractor is not negative, 1 is written therein as a quotient (fifth cycle, action 4-2). Then, the output of the adder/subtractor 114 is stored in the remainder register 111 (fifth cycle, action 4-3).

Next, the aforementioned action (4-1)~(4-3) of the fifth cycle is repeated further (n−2) times (sixth cycle—(n+3) cycle).

If the output of the remainder register 111 is not negative, the remainder register 111 holds the value as it does. On the other hand, if the output of the remainder register 111 is negative, the output of the remainder register 111 and output of the divisor register 113 are summed up by means of the adder/subtractor 114 and its result is stored in the remainder register 111 ((n+4) cycle, action 6).

Next, if the sign of the dividend is the same as the sign of the divisor, the output of the dividend/quotient register 112 is stored in the dividend/quotient register 112. If the sign of the dividend is different from the sign of the divisor, a complement of the output of the dividend/quotient register 112 is taken and written back to the dividend/quotient register 112 ((n+5) cycle, action 7).

If the dividend is not negative, the output of the remainder register 111 is held. If the dividend is negative, a complement of the output of the remainder register 111 is taken and written back to the remainder register 111 ((n+6) cycle, action 8).

Finally, the quotient is stored in the dividend/quotient register 112 and the remainder is stored in the remainder register 111, and then the signed division is terminated ((n+7) cycle, action 9).

The division processing is carried out as described above. FIG. 4 shows an example of division in which dividend a=1001 (binary) (means −7 according to decimal notation) and divisor b=0011 (binary) (means 3 according to decimal notation) like the aforementioned conventional example. In FIG. 4, the content of the remainder register 111 is expressed by P, the content of the dividend/quotient register 112 is expressed by A and the content of the divisor register 113 is expressed by B.

As described above, when it is intended to obtain a quotient and remainder accurately in division operation of the signed dividend and divisor, if the dividend and/or divisor is negative, by taking a complement of 2, the negative values are converted to positive values and the division is carried out with positive dividend and divisor. Thus, if both the dividend and divisor are negative, a complement of 2 must be taken for both the values. Thus, a time for taking a complement is added to division time so that the division time is extended, which is disadvantage of the prior art. Further, if the dividend is negative, a complement of 2 of a reminder also must be taken to be corrected, thereby further increasing the division time.

SUMMARY OF THE INVENTION

Accordingly, the present invention has been achieved in order to solve the above problem, and it is an object of the invention to provide a division circuit capable of obtaining accurate quotient and remainder by carrying out signed division without converting to positive values even if the dividend and/or divisor is negative.

To achieve the above object, there is provided a division circuit comprising: a divisor register for storing a divisor: a dividend register for storing a dividend at the time of division start and shifting a stored value therein by predetermined bits and holding during division operation; an adder/subtractor for carrying out addition and subtraction; a remainder register for storing an output of the adder/subtractor during the division operation and storing a remainder at the time of division termination; a quotient register for storing a quotient; a selector for selecting a combined value obtained by combining high order predetermined bits of a content stored in the dividend register with predetermined bits of a content stored in the remainder register or a result of operation of the adder/subtractor, and then outputting to the remainder register; an all zero detector for determining whether or not a partial remainder is 0; a first comparator for comparing the sign of the dividend to the sign of the divisor; a second comparator for comparing the sign of operation result of the adder/subtractor to the sign of the dividend; and a control circuit for determining the quotient based on determination result of the all zero detector and comparison result of the second comparator so as to control selection of the selector, the adder/subtractor carrying out addition or subtraction for the combined value and the divisor according to comparison result of the first comparator, the control circuit determining the quotient based on the comparison result of the second comparator and the determination result of the all zero detector, the selector selecting the combined value or the operation result of the adder/subtractor according to the quotient and outputting to the remainder register, the dividend register repeating operation for shifting a stored value therein by predetermined bits and then storing by a predetermined frequency, the quotient register for, when the sign of the dividend is different from the sign of the divisor, obtaining a complement of a stored value therein and storing the complement therein.

According to a preferred embodiment of the present invention, the adder/subtractor, when the sign of the dividend is the same as the sign of the divisor according to the comparison result of the first comparator, subtracts the divisor from the combined value, and when the sign of the dividend is different from the sign of the divisor according to the comparison result of the first comparator, sums up the combined value and the divisor.

According to another preferred embodiment of the present invention, the control circuit, when the sign of output of the adder/subtractor is the same as the sign of the dividend according to the comparison result of the second comparator, writes 1 into the least significant level of the quotient register as the quotient, when the sign of output of the adder/subtractor is different from the sign of the dividend according to the comparison result of the second comparator and the partial remainder is 0 according to the determination result of the all zero detector, writes 1 into the least significant level of the quotient register as the quotient, and when the sign of output of the adder/subtractor is different from the sign of the dividend according to the comparison result of the second comparator and the partial remainder is not 0 according to the determination result of the all zero detector, writes 0 into the least significant level of the quotient register as the quotient.

According to still another preferred embodiment of the present invention, the dividend register and the quotient register are the same shared register and during division operation, predetermined bits of a value stored in the shared register are successively shifted to high order by predetermined bits each while the quotient being stored successively from low order of the shared register.

According to further embodiment of the present invention, both signed division and unsigned division are carried out by extending 0 to upper sides of the dividend and the divisor when the unsigned division is carried out, and by extending sign bits over the dividend and the divisor when the signed division is carried out.

Further to achieve the above object, there is provided a division circuit comprising: a divisor register for storing a divisor; a dividend register for storing a dividend at the time of division start and shifting a stored value therein by predetermined bits and holding during division operation; an adder/subtractor for carrying out addition and subtraction; a remainder register for storing an output of the adder/subtractor during the division operation and storing a remainder at the time of division termination; a quotient register for storing a quotient; an all zero detector for determining whether or not a temporary partial remainder is 0; a first comparator for comparing the sign of the dividend with the sign of the divisor; a second comparator for comparing the sign of operation result of the adder/subtractor with the sign of the dividend; and a control circuit for determining the quotient based on determination result of the all zero detector and comparison results of the first comparator and the second comparator and then instructing the adder/subtractor to carry out addition or subtraction of a next cycle according to the quotient and the comparison result of the first comparator, the adder/subtractor carrying out addition or subtraction about the divisor and a combined value obtained by combining high order predetermined bits of a content stored in the dividend register with predetermined bits of a content stored in the remainder register according to the comparison result of the first comparator, the control circuit determining the quotient based on the comparison result of the second comparator and the determination result of the all zero detector and storing operation result of addition or subtraction by the adder/subtractor in the remainder register, the control circuit repeating operation for carrying out addition or subtraction by the adder/subtractor with respect to the combined value of the next cycle and the divisor according to an instruction of the control circuit based on the quotient obtained at a previous cycle, operation for determining a quotient in the same manner as the determination of the quotient according to operation result of the addition or subtraction, operation for shifting a value of the dividend register by predetermined bits and storing, and operation for storing operation result of the adder/subtractor in the remainder register, by a predetermined frequency, the remainder register correcting a stored value therein according to the quotient obtained at the previous cycle and storing the corrected value therein, the quotient register, when the sign of the dividend is different from the sign of the divisor, obtaining a complement of the stored value and storing the complement therein.

The nature, principle and utility of the invention will become more apparent from the following detailed description when read in conjunction with the accompanying drawings.

BRIEF DESCRIPTION OF THE DRAWINGS

In the accompanying drawings:

FIG. 2 is a diagram showing an example of division under the structure of FIG. 1;

FIG. 4 is a diagram showing an example of division under the structure of FIG. 3;

FIG. 7 is a diagram showing an example of division under the structure of FIG. 5;

FIG. 9 is a diagram showing an example of division under the structure of FIG. 8;

DESCRIPTION OF THE PREFERRED EMBODIMENTS

Hereinafter, the embodiment of the present invention will be described with reference to the accompanying drawings.

Figure 5:
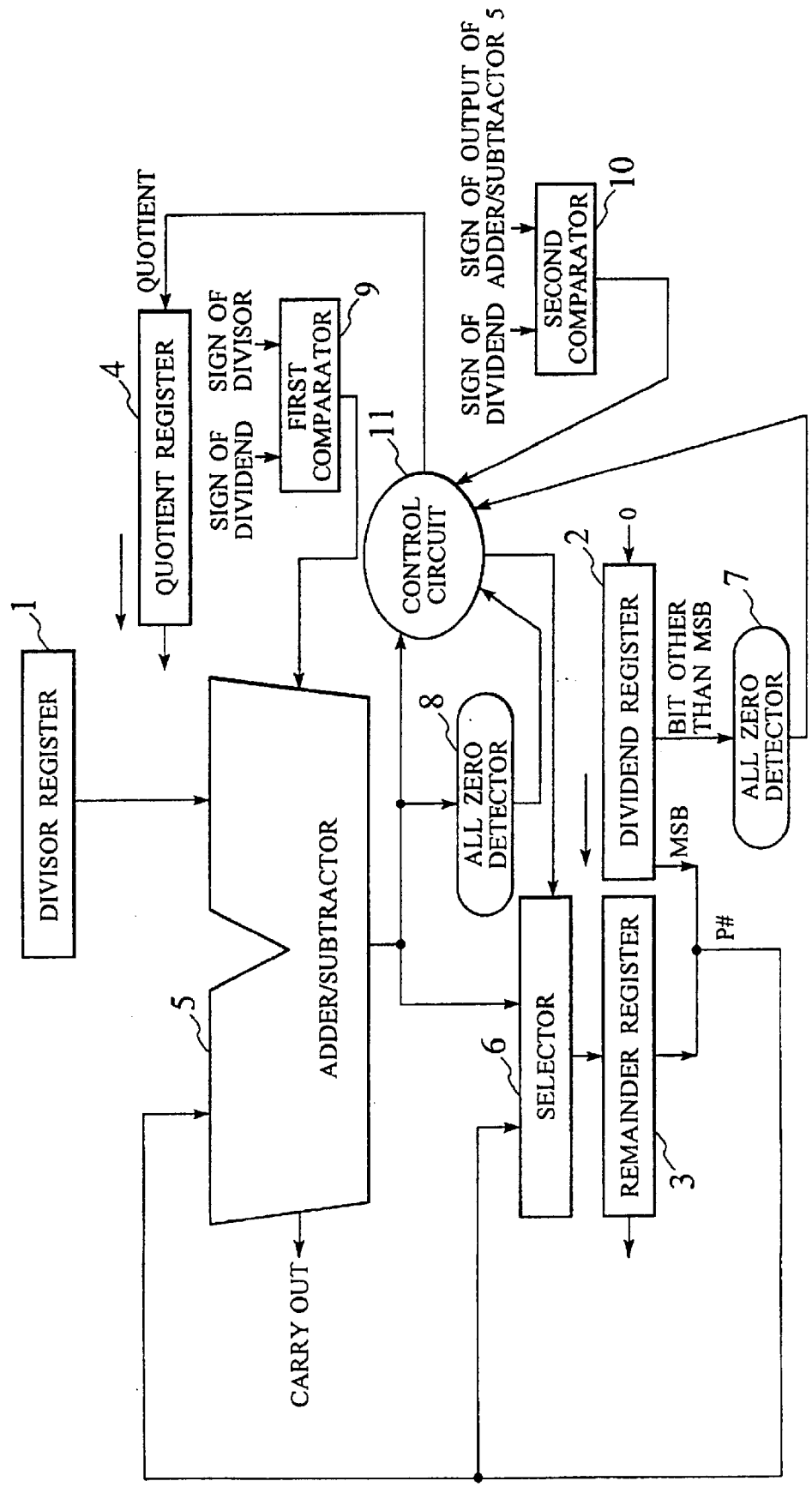
FIG. 5 is a diagram showing a structure of a division circuit according to an embodiment of the present invention.

FIG. 5 is a diagram showing a structure of a division circuit according to an embodiment of the present invention.

This embodiment is so constructed that division is carried out with a signed dividend and divisor according to the aforementioned conventional restoring type division algorithm and is completely different from the aforementioned restoring type division algorithm in terms of quotient determining method.

Determining whether or not 1 rises at k bit from low order is carried out by comparing a part of partial remainder with divisor×$2^{k-1}$ at that time in terms of absolute value. When the absolute value of part of the partial remainder is smaller than that of divisor×$2^{k-1}$, its quotient is 0 and in other cases, it is 1. As for the comparison of the absolute value, when the partial remainder and divisor are of the same sign, the divisor is subtracted from part of the partial remainder, and when they are of different signs, this comparison can be carried out by adding the divisor to the part of the partial remainder. If its result has the same sign as the partial remainder, the absolute value of part of the partial remainder is larger, so that 1 is obtained as quotient. On the other hand, if the result of operation is of different sign from the partial remainder, the quotient is 0. However, it is when the absolute value of a result of such addition or subtraction is 0 that the comparison of the sign of the result of the addition or subtraction cannot be carried out. When the result of such addition or subtraction is 0 and the remained partial remainder is also 0, regardless of the sign of the result of the operation, it comes that the partial remainder is equal to the divisor in terms of absolute value, so that the quotient is 1. The division circuit of this embodiment has a feature structure of the present invention for detecting this state, which is not provided on the prior art. Hereinafter, a structure of a concrete structure of the division circuit of the present embodiment and operation thereof will be described.

Referring to FIG. 5, the division circuit of the present embodiment comprises: when it is assumed that dividend of signed n bits expressed as complement of 2 is a and divisor of m bits is b, a m-bit divisor register 1 for storing a signed divisor; a n-bit dividend register 2 for storing a signed dividend at the time of division start and shifting low order bits of a partial remainder and storing during division operation; a m-bit remainder register 3 for shifting high order bits of the partial remainder and storing during division operation and storing a remainder at the time of division end; a n-bit quotient register 4 for successively storing a quotient; a m-bit adder/subtractor 5 for carrying out addition and subtraction; a selector 6 in which data obtained by combining a content of the remainder register 3 with that of a dividend/quotient register 2 is shifted by 1 bit so that the highest bit is shifted out, and then, data P# of that high order n bits, namely, data obtained by combining low order n−1 bits of the remainder register 3 with the highest bit of the dividend register 2 or output of the adder/subtractor 5 is selected and supplied to the remainder register 3; an all zero detector 7 for determining whether or not low order (n−1) bits of the output of the dividend register 2 are all 0; an all zero detector 8 for determining whether or not low order (m−1) bits of the output of the adder/subtractor 5 are all 0; a first comparator 9 for comparing the sign of the dividend with that of the divisor; a second comparator 10 for comparing the sign of a result of operation carried out by the adder/subtractor 5 with the sign of the partial remainder so as to check whether or not they are the same or different; and a control circuit 11 for receiving result of determination of the all zero detectors 7, 8 and result of comparison of the second comparator 10 so as to determine a quotient to control selection of the selector 6.

Figure 6:
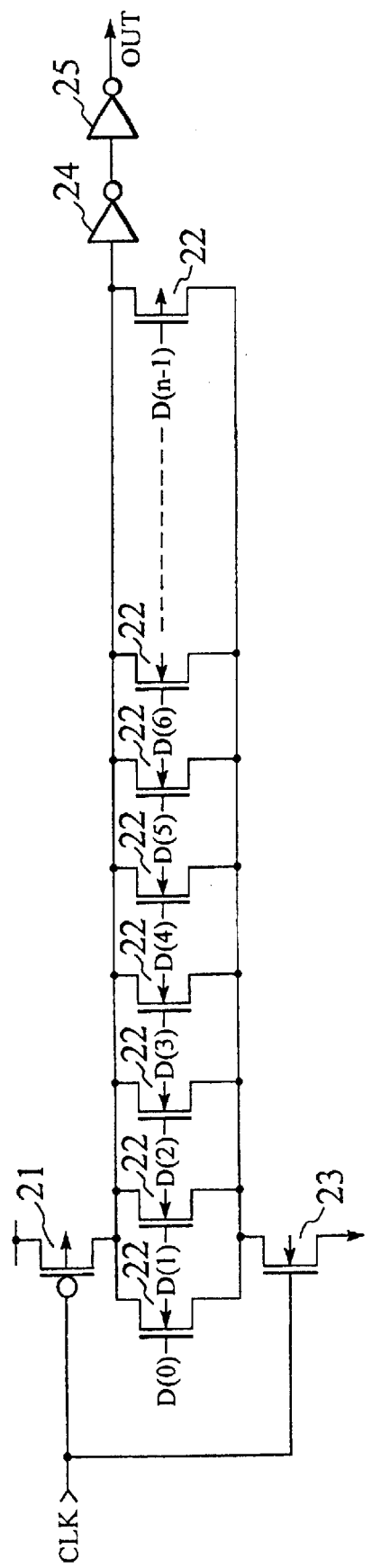
FIG. 6 is a diagram showing a structure of an all zero detector of FIG. 5.

The all zero detectors 7, 8 have a structure shown in FIG. 6. The all zero detectors 7, 8 of FIG. 6 is a circuit of pre-charge type synchronous with clock signal (CLK). Field effect transistor (hereinafter referred to as FET) 21 of P channel for receiving the clock signal, FETs 22 of N channel connected in parallel for receiving data for determining whether or not 0 arises or here, lower bit (n−1) of output of the dividend register 2 or lower bit (m−1) of output of the adder/subtractor 5, and FET 23 of N channel for receiving the clock signal are connected between high power supply and low power supply. When the clock signal is high level, if all data supplied to the FET 22 is 0, a determination result of 1 is outputted through buffers 24, 25. If any one of data supplied to the FET 22 is not 0, a determination result of 0 is outputted through the buffers 24, 25.

Next, the operation of signed division with a division circuit having such a structure will be described according to the operating cycle.

First, regardless of the signs of the dividend and divisor, the dividend a and divisor b are loaded on the dividend register 2 and divisor register 1 respectively. The sign of the dividend a is loaded on the remainder register 3 or data of significant bit of the dividend is loaded on all bits thereof. And 0 is loaded on all bits of the quotient register 4 (first cycle, action 1).

Next, the remainder register 3 and dividend register 2 are shifted by 1 bit to the left (higher order) and high order m bit of data obtained by combining both the registers after the shift is assumed to be P# (second cycle, action 2-1). Then, if the sign of the dividend a is the same as that of the divisor b, output data of the divisor register 1 is subtracted from data P# by means of the adder/subtractor 5. On the other hand, if the sign of the dividend a is different from that of the divisor b, the data P# and output data of the divisor register 1 are summed up by means of the adder/subtractor 5 (second cycle, action 2-2). Then, a content of the dividend register 2 is shifted by 1 bit. Then, 0 is stored at the least significant bit of the dividend register 2 (second cycle, action 2-3).

Next, the content of the quotient register 4 is shifted by 1 bit to the left. Data to be stored in the least significant bit of the quotient register 4 is determined as follows. If the sign of the output of the adder/subtractor 5 is the same as that of the dividend a, 1 is written to the least significant bit of the quotient / 4 as a quotient. Even if the sign of the output of the adder/subtractor 5 is different from that of the dividend a, if the outputs of the all zero detectors 7, 8 are both 1. 1 is written to the least significant bit of the quotient register 4 as a quotient. On the other hand, when the sign of the output of the adder/subtractor 5 is different from that of the dividend a and any one of the outputs of the all zero detectors 7, 8 is 0, 0 is written to the least significant bit of the quotient register 4 as a quotient (second cycle, action 2-4). Here, when both the outputs of the all zero detectors 7, 8 are 1, it means that the absolute values of the partial remainder and divisor×$2^{k-1}$ are equal at this time. (n−k+1) corresponds to frequency of addition/subtraction. Because basically the sign of the dividend a is the same as that of the partial remainder, the sign of the dividend a is used to determine a quotient.

Then, if a value of quotient determined in the previous action (2-4) is 1, the output of the subtractor 5 is stored in the remainder register 3, and if the value of quotient is 0, value of data P# is written to the remainder register 3 (second cycle, action 2-5).

Next, the actions (2-1)–(2-5) of the previous cycles are repeated (n−1) times (third cycle—(n+1) cycle).

Next, if the sign of the dividend is the same as that of the divisor, the output of the quotient register 4 is stored in the quotient register 4. On the other hand, when the sign of the dividend is different from that of the divisor, a complement of the output of the quotient register 4 is obtained and rewritten to the quotient register 4 ((n+2) cycle, action 4).

Finally, as a result of the above described operation, the quotient is stored in the quotient register 4 and the remainder is stored in the remainder register 3, and then the signed division is terminated ((n+3) cycle, action 5).

The division processing is carried out as described above. For example, a case of division under dividend a=1001 (binary) (means 7 in decimal order) and divisor b=0011 (binary) (means 3 in decimal order) like the aforementioned conventional case is shown in FIG. 7. In FIG. 7, the content of the divisor register 1 is represented by B, the content of the remainder register 3 is represented by P, the content of the dividend register 2 is represented by A and the content of the quotient register 4 is represented by Q.

Figure 1:
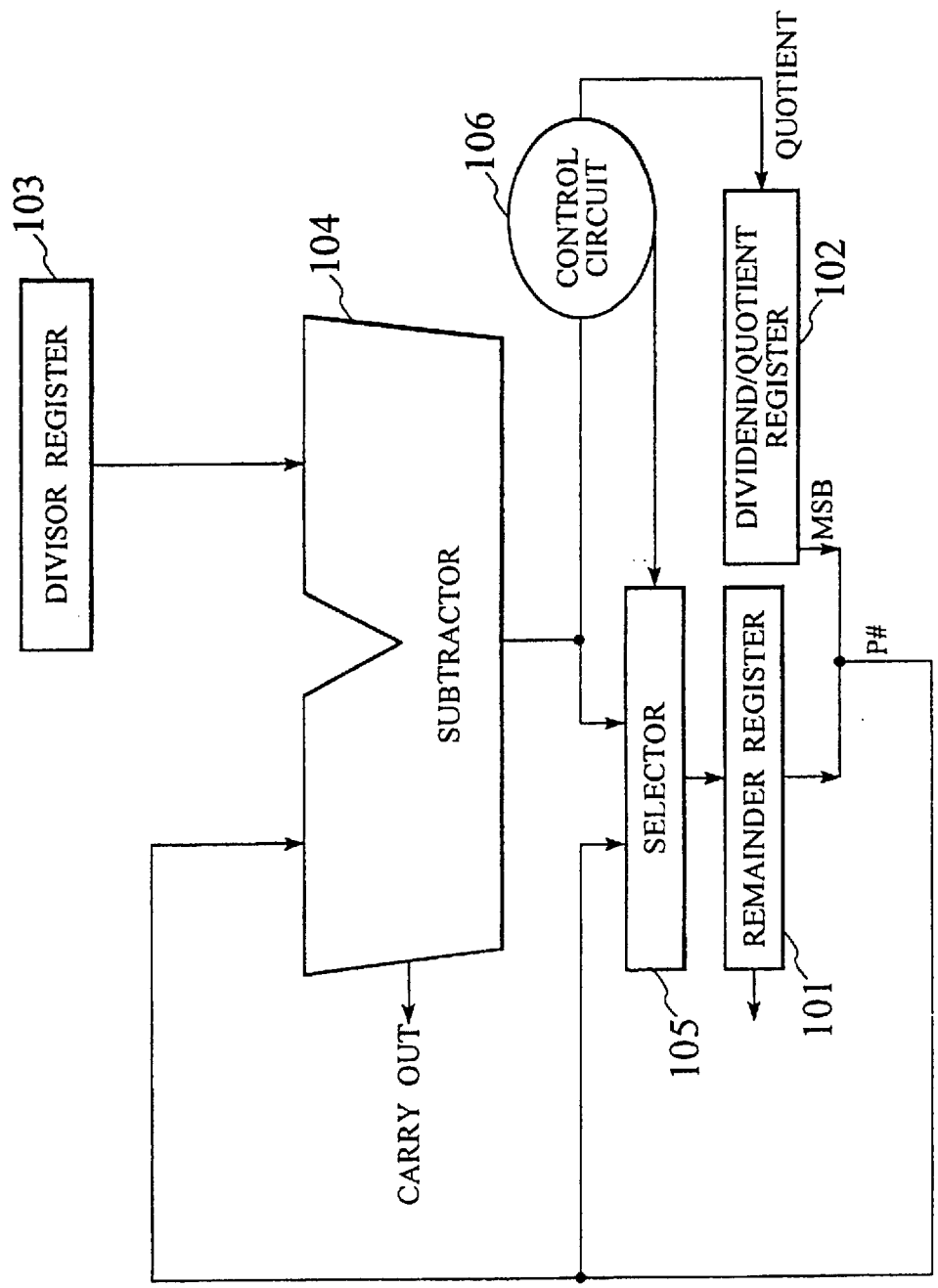
FIG. 1 is a diagram showing a structure of a division circuit of the prior art.
Figure 10:
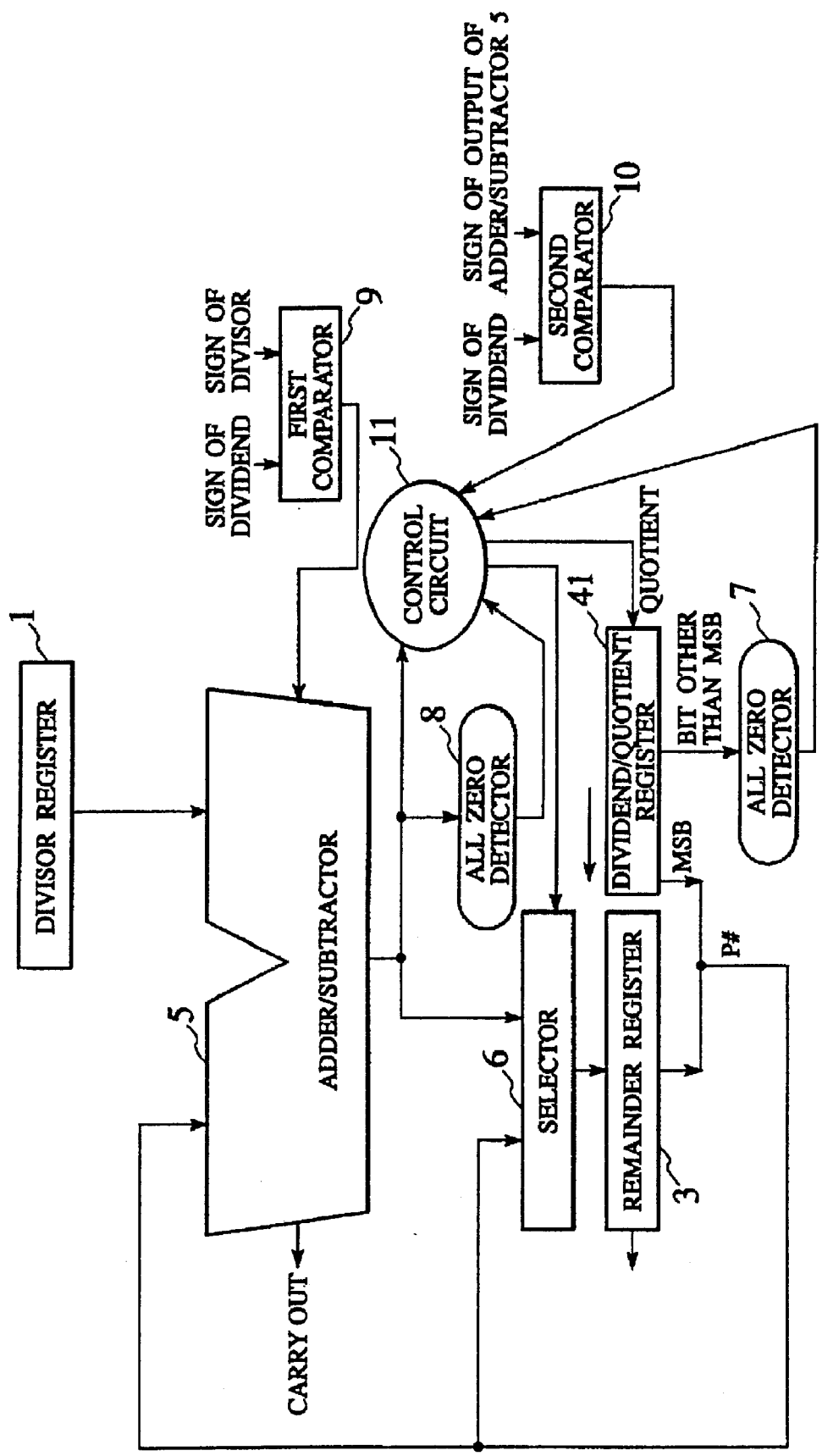
FIG. 10 is a diagram showing a structure of a division circuit according to a modified embodiment of the present invention.

Although in the present embodiment, the dividend registers 2 and quotient register 4 are separated from each other, if the dividend/quotient register 41 as a single register is shared as shown in FIG. 10 like the conventional structure shown in FIG. 1, the number of the registers can be reduced so that the installation area can be reduced. The other components in FIG. 10 are the same as those in FIG. 5.

In the above described embodiment, by using the signed dividend and divisor just as they are, comparing to the conventional example shown in FIG. 1, the necessities of calculation for the complements of the divisor and dividend and correction of the remainder are eliminated so that reduction of the dividing time can be achieved.

By extending 0 to upper side of the dividend and divisor when unsigned division is carried out, and then extending the sign bit over the dividend and divisor when signed division is carried out, it is possible to carry out signed division and unsigned division by the same division circuit with a small increase of the hardware amount.

Figure 8:
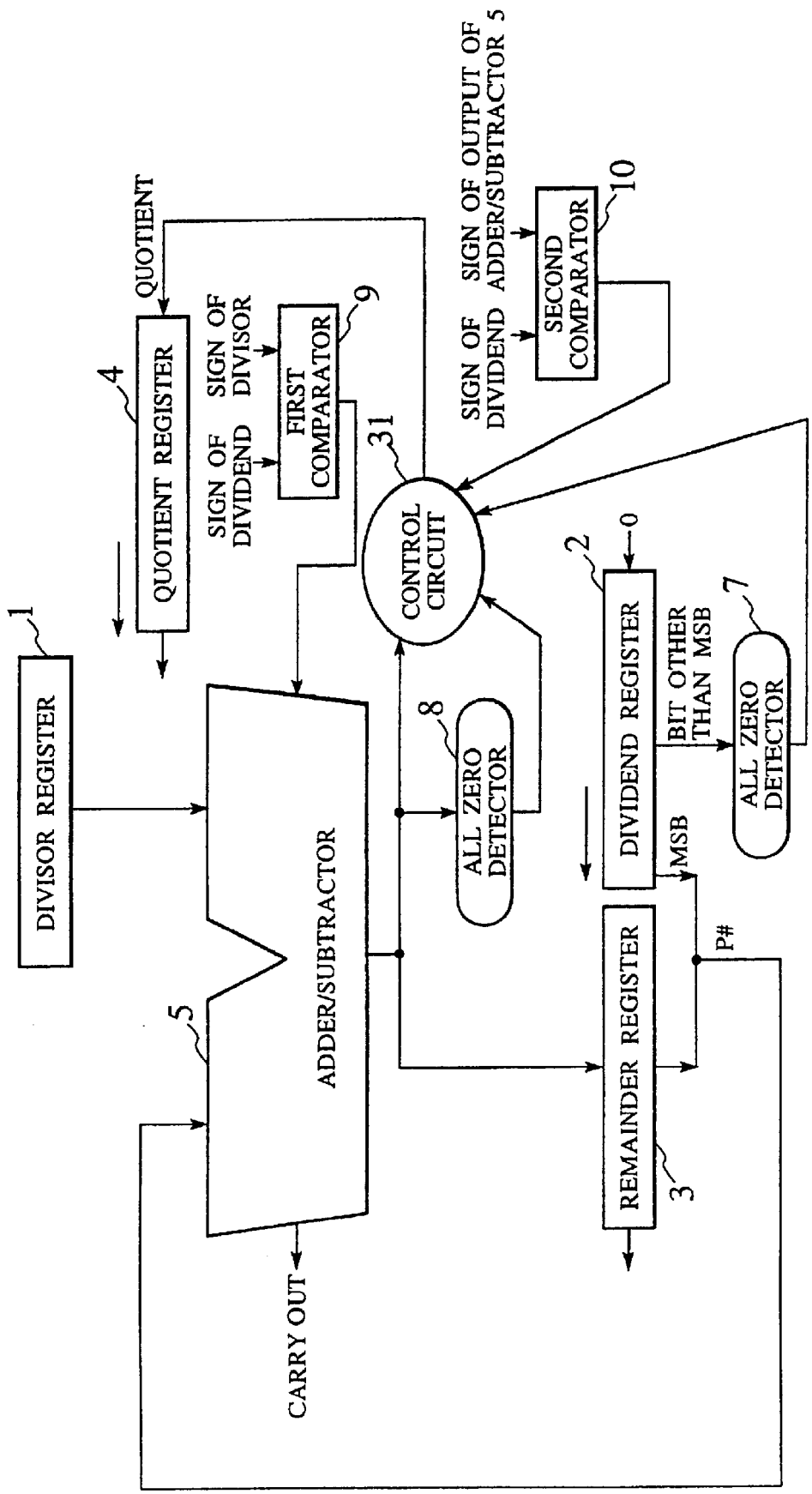
FIG. 8 is a diagram showing a structure of a division circuit according to other embodiment of the present invention.

FIG. 8 is a diagram showing a structure of a division circuit according to another embodiment of the present invention.

According to the present embodiment, division is carried out with the signed dividend and divisor basically based on the conventional non-restoring type division algorithm described previously. This is different from the aforementioned non-restoring type division algorithm in quotient determining method. If the quotient is 0, the output of the adder/subtractor is temporarily stored in a register as a temporary partial remainder instead of an accurate partial remainder. Further, if the divisor and dividend have the same sign, naturally subtraction is carried out for comparison of the absolute values in a previous cycle. However, to obtain an accurate partial remainder, summing of temporary partial remainder and divisor must be carried out. Thus, the summing of the temporary partial remainder and divisor is carried out in next cycle (according to (temporary remainder+divisor)×2−divisor=temporary remainder×2+divisor). On the other hand, if the sign of the divisor is different from that of the dividend, naturally addition is carried out for comparison of the absolute values in a previous cycle. However, to obtain an accurate partial remainder, subtraction to the divisor from the remainder must be carried out. Therefore, subtraction of the divisor from the partial remainder is carried out to obtain an accurate partial remainder (according to (temporary remainder−divisor)×2+divisor=temporary remainder×2−divisor).

As a result, the same result as in division according to the above embodiment can be provided.

In the division circuit of the present embodiment of FIG. 8, if it is assumed that signed n-bit dividend expressed as complement of 2 is a and m-bit divisor is b, as compared to the structure shown in FIG. 5, the selector 6 of FIG. 5 is removed so that the output of the adder/subtractor 5 is inputted to the remainder register 3 and instead of the control circuit 11 shown in FIG. 5, a control circuit 31 for receiving determining results of the first and second comparators 9, 10 and all zero detectors 7, 8 to determine a quotient and instructing the adder/subtractor 5 for addition or subtraction is provided. The other structure is the same as that shown in FIG. 5 and therefore they are expressed by the same reference numerals.

Next, the signed division operation using the division circuit having such a structure will be described according to its operating cycle.

First, regardless of the signs of the dividend and divisor, the dividend a and divisor b are loaded on the dividend register 2 and divisor register 1 respectively. The sign of the dividend a or here data of the significant bit of the dividend a is loaded on all bits thereof and 0 is loaded on all bits of the quotient register 4 (first cycle, action 1).

Next, the remainder register 3 and dividend register 2 are shifted by 1 bit each to the left and high order m bit of data obtained by combining both the registers after the shift is assumed to be P# (second cycle, action 2-1). Then, if the sign of the dividend a is the same as that of the divisor b, output data of the divisor register 1 is subtracted from data P# by means of the adder/subtractor 5, and if the sign of the dividend a is different from that of the divisor b, the data P# and output data of the divisor register 1 are summed up by means of the adder/subtractor 5 (second cycle, action 2-2). Then, the output of the dividend register 2 is shifted by 1 bit to the left and stored and 0 is stored at the least significant bit of the dividend register 2 (second cycle, action 2-3).

Next, the content of the quotient register 4 is shifted by 1 bit to the left. Data to be stored in the least significant bit of the quotient register 4 is determined as follows. If the sign of the output of the adder/subtractor 5 is the same as that of the dividend a, 1 is written to the least significant bit of the quotient register 4 as a quotient. On the other hand, even if the sign of the output of the adder/subtractor 5 is different from that of the dividend a, if the outputs of the all zero detectors 7, 8 are both 1, 1 is written to the least significant bit of the quotient register 4 as a quotient. On the other hand, when the sign of the output of the adder/subtractor 5 is different from that of the dividend a and any one of the outputs of the all zero detectors 7, 8 is 0, 0 is written to the least significant bit of the quotient register 4 as a quotient (second cycle, action 2-4). Subsequently, the output of the adder/subtractor 5 is stored in the remainder register 3 (second cycle, action 2-5). Here, when both the outputs of the all zero detectors 7, 8 are 1, it means that the absolute values of the partial remainder and divisor×$2^{k-1}$ are equal at the time. (n−k+1) corresponds to frequency of addition/subtraction. Because basically the sign of the dividend a is the same as that of the partial remainder, the sign of the dividend a is used to determine a quotient.

In a next cycle, when a quotient calculated in action 2-4 of a previous cycle is 1, the contents of the remainder register 3 and dividend register 2 are shifted by 1 bit each to the left. When the sign of the dividend a is the same as that of the divisor b, the output of the divisor register 1 is subtracted from data P# which is high order m bit of data obtained by combining the contents of both the registers after the shift, and if the sign of the dividend a is different from that of the divisor b, the data P# and output data of the divisor register 1 are summed up by means of the adder/subtractor 5. On the other hand, if the quotient calculated by action 2-4 of the previous cycle is 0, the contents of the remainder register 3 and the dividend register 2 are shifted by 1 bit each to the left. If the sign of the dividend a is the same as that of the divisor b, data P# and the output of the divisor register 1 are summed up by means of the adder/subtractor 5. If the sign of the dividend a is different from that of the divisor b, the output of the remainder register 1 is subtracted from data P# by means of the adder/subtractor 5 (third cycle, action 3-1). Then, the content of the dividend register 2 is shifted by 1 bit to the left and 0 is stored at the least significant bit of the dividend register 2 (third cycle, action 3-2). Then, the content of the quotient register 4 is shifted by 1 bit to the left. Data to be stored at the least significant bit of the quotient register 4 is determined in the same way as that carried out in "second cycle, action 2-4" and stored in the quotient register 4 (third cycle, action 3-3). Then, the output of the adder/subtractor 5 is stored in the remainder register 3 (third cycle, action 3-4).

Then, the actions (3-1)~(3-4) of the third cycle are repeated (n−2) times (fourth cycle—(n+1) cycle).

If the quotient calculated in a just before cycle is 1, the remainder register 3 holds that value. If the calculated quotient is 0 and the sign of the dividend a is the same as that of the divisor b, the output of the remainder register 3 and output of the divisor register 1 are summed up by means of the adder/subtractor 5 and then its result is stored in the remainder register 3. If the calculated quotient is 0 and the sign of the dividend a is different from that of the divisor b, the output of the divisor register 1 is subtracted from the output of the remainder register 3 by means of the adder/subtractor 5 and its result is stored in the remainder register 3 ((n+2) cycle, action 5).

Next, if the sign of the dividend is the same as that of the divisor, the output of the quotient register 4 is stored in the quotient register 4. If the sign of the dividend is different from that of the divisor, a complement of 2 of the output of the quotient register 4 is obtained and rewritten to the quotient register 4 ((n+3) cycle, action 6).

Finally, the quotient is stored in the quotient register 4 and the remainder is stored in the remainder register 3, so that the signed division is terminated ((n+4) cycle, action 7).

The division processing is carried out in the above manner. As example of division in which dividend a=1001 (binary) (means −7 according to decimal notation) and divisor b=0011 (binary) (means 3 according to decimal notation) is shown in FIG. 9. Meanwhile, in FIG. 9, the content of the divisor register 1 is expressed by B, the content of the remainder register 3 is expressed by P, the content of the dividend register 2 is expressed by A and the content of the quotient register 4 is expressed by Q.

Figure 3:
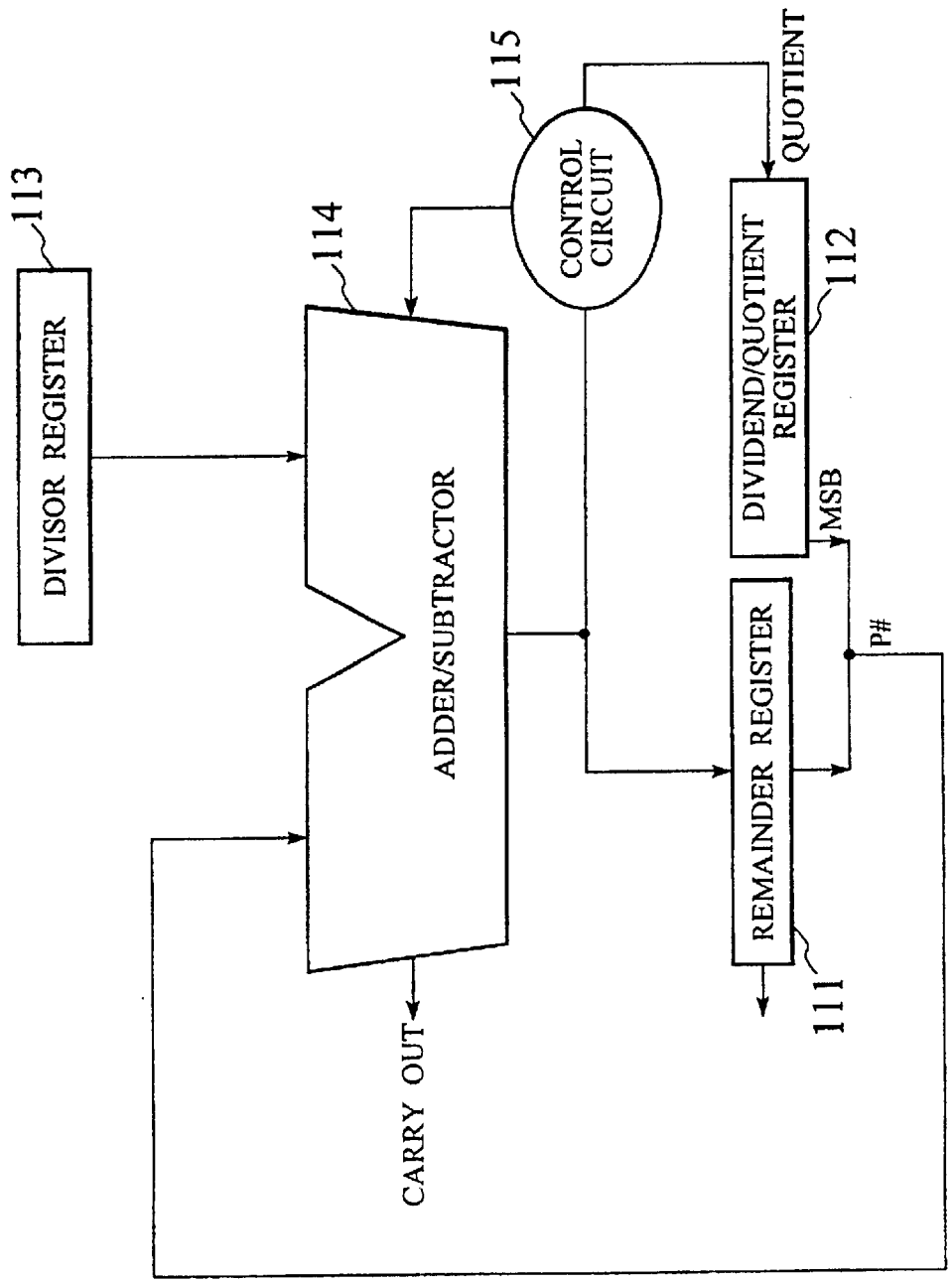
FIG. 3 is a diagram showing another structure of a division circuit of the prior art.
Figure 11:
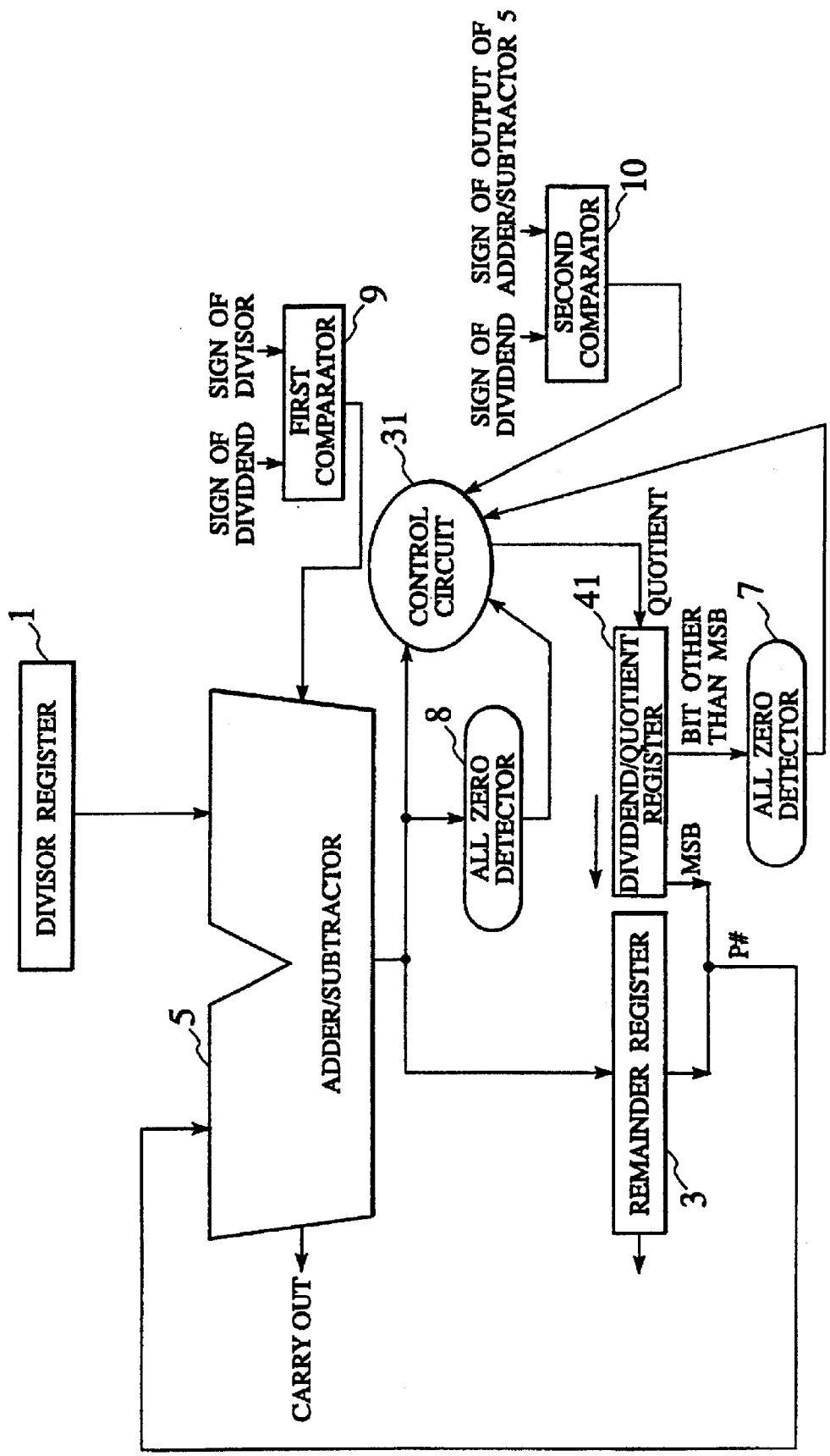
FIG. 11 is a diagram showing a structure of a division circuit according to another modified embodiment of the present invention.

Although the dividend register 2 and quotient register 4 are separated from each other according to the present embodiment, if the dividend/quotient register 41 as a single register is shared as shown in FIG. 11 like in the conventional structure shown in FIG. 3, the number of the registers can be reduced so that installation area can be reduced. The other components in FIG. 11 are the same as those in FIG. 8.

In the above described embodiment, by using the signed dividend and divisor just as they are, comparing to the conventional example shown in FIG. 3, the necessities of calculation for the complements of 2 of the divisor and dividend and correction of the remainder are eliminated so that reduction of the dividing time can be achieved. Although the frequency of addition/subtraction for final correction of the remainder is more by 1 than the embodiment shown in FIG. 5, because pull-back time can be subtracted, it is possible to reduce a time took for operation of each cycle.

By extending 0 to upper side of the dividend and divisor when unsigned division is carried out, and then extending the sign bit over the dividend and divisor when signed division is carried out, it is possible to carry out signed division and unsigned division by the same division circuit with a small increase of the hardware amount.

It should be understood that many modifications and adaptations of the invention will become apparent to those skilled in the art and it is intended to encompass such obvious modifications and changes in the scope of the claims appended hereto.

What is claimed is:

1. A division circuit comprising:
   a comparator configured to compare the sign of a dividend and the sign of a divisor;
   an adder/subtractor configured to carry out addition or subtraction for data of predetermined bits of partial dividend to be input and the divisor according to comparison result of the comparator and output result of the addition or subtraction as data of predetermined bits of a temporary partial remainder, the data of the predetermined bits of the partial dividend at a first cycle being data obtained by adding predetermined extension bits including a sign bit to a high-order side of the dividend, the data of the predetermined bits of the partial reminder at the following cycles being data obtained by logically shifting a partial reminder of a preceding cycle to the left by one bit;
   an all zero detector configured to determine whether or not the temporary partial remainder is 0, the temporary partial remainder being obtained by connecting the data of the predetermined bits of the temporary partial remainder and data of the partial dividend excluding the predetermined bits thereof; and
   a controller configured to determine one digit of a quotient based on the sign of the temporary partial remainder, the sign of the dividend and determination result of the all zero detector, select the data of the predetermined bits of the partial dividend or data of predetermined bits of the temporary partial remainder according to a value of the one digit of the quotient, connect the selected data with the data of the partial dividend excluding the predetermined bits thereof to obtain the partial remainder, then obtain the partial dividend for the next cycle from the partial remainder, further input the data of the predetermined bits of the partial dividend into the adder/subtractor, and thus control the adder/subtractor to repeat the addition or subtraction by a predetermined frequency.

2. A division circuit according to claim 1, wherein the adder/subtractor, when the sign of the dividend is the same as the sign of divisor according to the comparison result of the comparator, subtracts the divisor from the data of the predetermined bits of the partial dividend, and when the sign of the dividend is different from the sign of divisor according to the comparison result of the comparator, sums up the data of the predetermined bits of the partial dividend and the divisor.

3. A division circuit according to claim 1, wherein the controller, when the sign of the temporary partial remainder is the same as the sign of the dividend, selects 1 as the one digit of the quotient, when the sign of the temporary partial remainder is different from the sign of the dividend and temporary partial remainder is 0 according to the determination result of the all zero detector, selects 1 as the one digit of the quotient, and when the sign of the temporary partial remainder is different from the sign of the dividend and the temporary partial remainder is not 0 according to the determination result of the all zero detector, selects 0 as the one digit of the quotient.

4. A division circuit according to claim 1, the controller comprising:
- a dividend register configured to store the dividend;
- a selector configured to input the data of the predetermined bits of the partial dividend and the data of the predetermined bits of the temporary partial remainder to select and output either of the two data according to a value of the one bit of the quotient; and
- a remainder register configured to store an output of the selector,
- wherein the controller controls the adder/subtractor to repeat the addition or subtraction by the predetermined frequency while inputting the data of the predetermined bits of the partial dividend for the next cycle stored in the dividend register and the remainder register into the adder/subtractor and the selector.

5. A division circuit according to claim 4, wherein, upon controlling the adder/subtractor to repeat the addition or subtraction by the predetermined frequency, the controller successively shifts predetermined bits of a value stored in the dividend register to high order by predetermined bits each while successively storing the one digit of the quotient into the dividend register from low order.

6. A division circuit according to claim 1, wherein, when the sign of the dividend is different from the sign of the divisor, the controller controls the adder/subtractor to repeat the addition or subtraction by the predetermined frequency and then obtains a true quotient by finding a complement of a value of the quotient obtained by the repeated addition or subtraction.

7. A division circuit according to claim 1, further comprising a devisor register configured to initially store the devisor wherein the dividend register and the devisor register initially stores an unsigned dividend and an unsigned devisor, respectively.

8. A division circuit comprising:
- a comparator configured to compare the sign of a dividend and the sign of a divisor;
- an adder/subtractor configured to carry out addition or subtraction for data of predetermined bits of partial dividend to be input and the divisor and output result of the addition or subtraction as data of predetermined bits of a temporary partial remainder, the data of the predetermined bits of the partial dividend at a first cycle being data obtained by adding predetermined extension bits including a sign bit to a high-order side of the dividend, the data of the predetermined bits of the partial remainder at the following cycles being data obtained by logically shifting a partial reminder of a preceding cycle to the left by one bit;
- an all zero detector configured to determine whether or not the temporary partial remainder is 0, the temporary partial remainder being obtained by connecting the data of the predetermined bits of the temporary partial remainder and data of the partial dividend excluding the predetermined bits thereof; and
- a controller configured to determine one digit of a quotient based on the sign of the temporary partial remainder, the sign of the dividend and determination result of the all zero detector, instruct the adder/subtractor to carry out addition or subtraction of a next cycle, in a first cycle according to comparison result of the comparator and in the following cycles according to a value of the one digit of the quotient and the comparison result of the comparator, obtain the partial dividend for the next cycle from the temporal partial remainder, further input the data of the predetermined bits of the partial dividend into the adder/subtractor, and thus control the adder/subtractor to repeat the addition or subtraction by a predetermined frequency according to the value of the one digit of the quotient and the comparison result of the comparator.

9. A division circuit according to claim 8, wherein the controller, when the value of the one digit to the quotient is 1 and the sign of the dividend is the same as the sign of the divisor and also when the value of the one digit to the quotient is 0 and the sign of the dividend is different from the sign of the divisor, instructs the adder/subtractor to carry out the subtraction of the next cycle, and when the value of the one digit to the quotient is 1 and the sign of the dividend is different from the sign of the divisor and also when the value of the one digit to the quotient is 0 and the sign of the dividend is the same as the sign of the divisor, instructs the adder/subtractor to carry out the addition of the next cycle.

10. A division circuit according to claim 8, wherein the controller, when the sign of the temporary partial remainder is the same as the sign of the dividend, selects 1 as the one digit of the quotient, when the sign of the temporary partial remainder is different from the sign of the dividend and the temporary partial remainder is 0 according to the determination result of the all zero detector, selects 1 as the one digit of the quotient, and when the sign of the temporary partial remainder is different from the sign of the dividend and the temporary partial remainder is not 0 according to the determination result of the all zero detector, selects 0 as the one digit of the quotient.

11. A division circuit according to claim 8, the controller comprising:
- a dividend register configured to store the dividend;
- a remainder register configured to store the predetermined bits of the temporary partial remainder outputted from the adder/subtractor,
- wherein the controller controls the adder/subtractor to repeat the addition or subtraction by the predetermined frequency while inputting data of the predetermined bits of the partial dividend for the next cycle stored in the dividend register and the remainder register into the adder/subtractor.

12. A division circuit according to claim 11, after controlling the adder/subtractor to repeat the addition or subtraction by the predetermined frequency, the controller carries out addition or subtraction for a value stored in the remainder register and divisor according to the value of the one digit of the quotient obtained in a previous cycle to obtain a true remainder and, when the sign of the dividend is different from the sign of the divisor, obtains a true quotient by finding a complement of a value of the quotient obtained by the repeated addition or subtraction.

13. A division circuit according to claim 11, wherein, upon controlling the adder/subtractor to repeat the addition or subtraction by the predetermined frequency, the controller successively shifts predetermined bits of a value stored in the dividend register to high order by predetermined bits each while successively storing the one digit of the quotient into the dividend register from low order.

14. A division circuit according to claim 8, further comprising a devisor register configured to initially store the devisor wherein the dividend register and the devisor register initially stores an unsigned dividend and an unsigned devisor, respectively.

* * * * *